(12) United States Patent
Gnanasambandam et al.

(10) Patent No.: US 8,464,075 B2
(45) Date of Patent: Jun. 11, 2013

(54) SYSTEM AND METHOD FOR POLICY-DRIVEN FILE SEGMENTATION AND INTER-CLOUD FILE STORAGE AND RETRIEVAL

(75) Inventors: Shanmuga-nathan Gnanasambandam, Webster, NY (US); Naveen Sharma, Fairport, NY (US); Wendell Lewis Kibler, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 568 days.

(21) Appl. No.: 12/486,951

(22) Filed: Jun. 18, 2009

(65) Prior Publication Data

US 2010/0325422 A1 Dec. 23, 2010

(51) Int. Cl.
*H04L 29/00* (2006.01)
(52) U.S. Cl.
USPC ............................................ 713/193; 726/27
(58) Field of Classification Search
None
See application file for complete search history.

(56) References Cited

U.S. PATENT DOCUMENTS

| | | | |
|---|---|---|---|
| 6,871,277 B1* | 3/2005 | Keronen | 713/167 |
| 7,299,364 B2* | 11/2007 | Noble et al. | 713/189 |
| 2006/0259983 A1* | 11/2006 | Sperry | 726/28 |
| 2008/0177767 A1 | 7/2008 | Lin et al. | |
| 2008/0177873 A1 | 7/2008 | Ni et al. | |
| 2008/0183891 A1 | 7/2008 | Ni et al. | |
| 2008/0222201 A1* | 9/2008 | Chen et al. | 707/104.1 |

* cited by examiner

*Primary Examiner* — Ghazal Shehni
(74) *Attorney, Agent, or Firm* — Fay Sharpe LLP

(57) ABSTRACT

A file storage system includes one or more document input devices and a processor communicating with both a memory and the one or more document input devices. The processor executes a software application stored on the memory to separate a sensitive portion of a document from an insensitive portion of a document. A first type of cloud storage includes one or more storage devices in operable communication with the one or more document input devices. The first type of cloud storage is configured to store one or both of the separated portions with a level of encryption agreed upon by a user. A second type of cloud storage includes one or more storage devices in operable communication with the one or more document input devices. The second type of cloud storage is configured to store the insensitive portion of a document based on a consent of the user.

19 Claims, 2 Drawing Sheets

SYSTEM AND METHOD FOR POLICY-DRIVEN FILE SEGMENTATION AND INTER-CLOUD FILE STORAGE AND RETRIEVAL

BACKGROUND

1. Field of the Related Art

The present disclosure generally relates to a distributed file storage system, and more particularly, to a system and method for automatically separating portions of a document based on the sensitivity of the content within those portions for storage in a cloud-based storage system.

2. Background of the Related Art

When considering applications such as electronic medical records (EMR), tax forms, surveys, claims, applications, etc., it is clear that private and public information may co-exist within a particular document. Further, there is a tendency for users to trust only certain parties to store their private information; not be overly concerned about how public information is stored (such as those parts of the document that are public); and expect a highly fault-tolerant and secure storage system.

With large-sized documents and the need to decrease administrative involvement, cloud storage has emerged as an option. It appears, however, that cloud storage has not addressed how public and private portions of a document can be stored, accessed and composed in an absolutely secure way according to the policy of the user (e.g., a patient).

SUMMARY

According to an embodiment of the present disclosure, a file storage system includes one or more document input devices and a processor communicating with both a memory and the one or more document input devices. The processor executes a software application stored on the memory to separate a sensitive portion of a document from an insensitive portion of a document. A first type of cloud storage includes one or more storage devices in operable communication with the one or more document input devices. The first type of cloud storage is configured to store one or both of the separated portions with a level of encryption agreed upon by a user. A second type of cloud storage includes one or more storage devices in operable communication with the one or more document input devices. The second type of cloud storage is configured to store the insensitive portion of a document based on a consent of the user.

According to another embodiment of the present disclosure, a method for storing documents in a distributed tile system (DFS) having one or more document input devices includes the steps of using the at least one document input device to process a document and using a processor to execute programmable instructions stored on a computer-readable medium to separate a sensitive portion of the document from an insensitive portion of the document. The method also includes the step storing the separated portions on an internal cloud storage and/or an external cloud storage based on a sensitivity and/or a privacy characteristic of the portion. The internal cloud storage and the external cloud storage are in operable communication with the one or more document input devices. The method also includes the step of accessing the separated portions from the internal cloud storage and/or the external cloud storage based on a user credential to generate the whole document.

According to another embodiment of the present disclosure, a computer-readable medium storing programmable instructions configured to be executed by one or more processors for performing a method of storing documents on a distributed file system (DFS) having one or more document input devices includes the steps of using the one or more document input devices to process a document and executing the programmable instructions with the processor to separate a sensitive portion of the document from an insensitive portion of the document. The method also includes the steps of using the one or more processors to separate the sensitive portion from the insensitive portion and storing the separated portions on an internal cloud storage and/or an external cloud storage based on a sensitivity of the portion. The internal cloud storage and the external cloud storage are in operable communication with the one or more document input devices. The method also includes the step of using a retrieval device to electronically access the separated portions from the internal cloud storage and/or the external cloud storage based on a user credential to generate the document.

BRIEF DESCRIPTION OF THE DRAWINGS

Various embodiments of the present disclosure will be described herein below with reference to the figures wherein.

DETAILED DESCRIPTION

Figure 1:
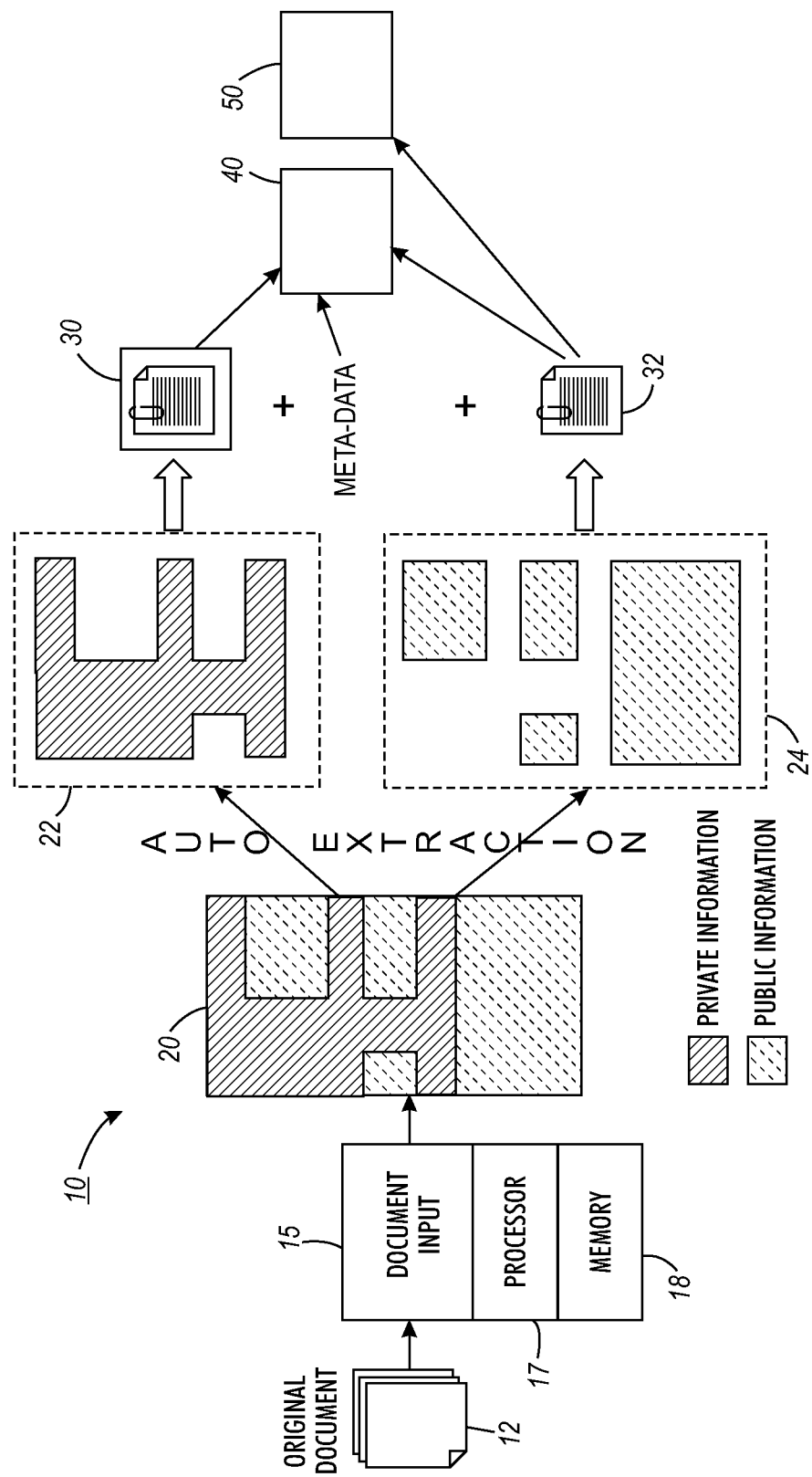
FIG. 1 is a schematic diagram of a file storage system, in accordance with the present disclosure.

Generally, the present disclosure relates to a storage system and method suitable for use with cloud computing and which utilizes a user-defined policy to determine how a file is segmented and stored in a distributed file system. Currently, electronic files (e.g., EMR) are processed as a whole, encrypted, and stored on a file system. However, users may not be comfortable having private information reside on external cloud storage. External cloud storage may be, for example, storage as a service that is external to a user or company firewall (e.g., Amazon, EC2, Google electronic medical records, etc.) and accessible by multiple vendors on a time-shared basis. Often, files stored on external cloud storage are protected only by encryption and access rights.

Patients may not want personal information (e.g., name, social security number, insurance number, etc.) to be accessible by third parties outside the medical office or hospital. Rather, patients may prefer to have their personal information be stored internally in an internal cloud storage or a preferred storage provider. However, public information such as disclosures, agreements, hospital addresses, forms, and other non-personal information may be stored elsewhere (e.g., on external cloud storage).

Cloud storage is facing problems in adoption by small and medium businesses, such as medical offices and hospitals, because, as understood, there is no automatic way to address the privacy concerns of the user or patient. Currently, there is no system or method to simultaneously satisfy the patient's privacy and reliability demands while reducing the storage and administrative burden of service providers and/or hospitals. Thus, there is a need to empower users to enable them to choose how their documents are stored and what level of security is protecting their stored documents. The present disclosure makes it possible to provide storage capacity requirements and reliability concerns of healthcare providers by automatically separating private from public portions of a document and storing the separated portions across multiple cloud storage services. Further, the present disclosure makes it possible to achieve the above while simultaneously meeting a user's security requirements by providing a storage policy (e.g., not allowing private portions of documents to be stored on external cloud storage storing on a vendor of choice at an extra cost) for each user, thereby guaranteeing a personalized level of security on an individual basis. Further, stored documents and/or their constituent blocks or portions may, in some embodiments, be replicated such that if blocks or portions of a document come into possession of a hacker, it is difficult to discern that stored blocks or portions are indeed replicas. Further, added effort is required to crack or break stored blocks or portions due to a relatively larger number of file blocks associated with replicas stored on public cloud storage, as will be discussed in further detail below. With this purpose in mind, the present disclosure may, in some embodiment, be implemented for use with an EMR system wherein private and public information contained within a document is identified, separated, and stored in blocks in accordance with a user-defined policy. The same concept of separability and storage may be implemented for use with various documents such as, for example, forms, bills, statements, receipts, tax returns, insurance policies, legal documents, etc.

With reference to FIG. 1, a file storage system 10 includes a number of components which will be described in detail. First, the file storage system 10 includes a document input device 15 that receives and digitizes an original document 12 into electronic page image(s) 20. The original document may be a hardcopy, an electronic document file, one or a plurality of electronic images, electronic data from, a printing operation, a file attached to an electronic communication or data from other forms of electronic communication. The document input device 15 includes a processor 17 and a memory 18. Processor 17 and memory 18 may be incorporated within document input device 15 or as part of a separate processing device (e.g., PC, server, computing device, etc.) operably coupled to document input device 15. The memory 18 is generic and may comprise RAM, ROM, CD-ROM, or other media of storage such as hard disk, magnetic tape, or the like. Other devices for accepting, capturing, and storing data are well known and the above list should not be construed as exhaustive. Document input device 15 may include one or more of the following well-known devices: a copier, a xerographic system, a digital image scanner (e.g., a flatbed scanner or a facsimile device), a disk reader having a digital representation of a document on removable media (CD, floppy disk, rigid disk, tape, or other storage medium) therein, or a hard disk or other digital storage media having one or more document images recorded thereon. Those skilled in the art will recognize that the file storage system 10 would work with any device suitable for printing or storing a digitized representation of a document.

As illustrated in FIG. 1, original documents 12 are digitized into electronic page image(s) 20 by processor 17. Stored in memory 18 is a suitable software application configured to be executed by processor 17 to identify and extract machine readable code in the electronic page image(s) 20. Further, a suitable code decoding software is stored on memory 18 and executed by processor 17 to extract digitally encoded information from the machine readable code. The electronic page image(s) 20 may include one or more passages of machine readable code including information that is sensitive or private and information that is insensitive or public. Further, the electronic page image(s) 20 may include passages of machine readable code that define the decoding scheme (also referred to as a control passage). The private and public information may include, but is not limited to, text, data, handwritten comments, markings, and images. Those skilled in the art will recognize that any information within a document that can be encoded into machine readable language may be selected as sensitive. The decoding scheme may include, but is not limited to, a suite of protocols, key ciphers, and user-prescribed actions. The decoding scheme may also contain decoding rules, and optionally, decryption rifles for the private information. During operation, the processor 17 executes software stored in memory 18 configured to determine document structure from interconnected documents and intelligently indicate specific information, passages, and/or components of the document as sensitive or insensitive information. Such a method is disclosed in commonly-owned U.S. Patent Publication No. 2006/0259983, the disclosure of which is incorporated herein by reference in its entirety.

File storage system 10 includes internal cloud storage 40 and external cloud storage 50, both of which are configured to communicate (e.g., via the internet or a suitable network communication protocol) with the input device 15. Each of internal cloud storage 40 and external cloud storage 50 may be implemented across a plurality of clouds as so-called "storage as a service" and include any one or more storage devices including, bid not limited to, a database, a plurality of networked databases, PCs, multifunction devices (MFD), printers, servers, etc. File storage system 10 may be implemented as a locale-aware distributed file system. An example of such a distributed file system is disclosed in commonly-owned U.S. patent application Ser. No. 12/362,163, the disclosure of which is incorporated herein by reference in its entirety. As described in further detail below, file storage system 10 further implements the use of bit-wise non-identical replicas of files processed by processor 17 for storage in internal cloud storage 40 and/or external cloud storage 50.

As illustrated in FIG. 1, the document structure of electronic page image 20 is processed and portions thereof are indicated as private information 22 (i.e., sensitive information) or public information 24 (i.e., insensitive information). Indications other than "private information" and "public information" may be utilized and the above list should not be construed as exhaustive. Generally, private information 32 is stored as a private file 30 on internal cloud storage 40 along with metadata extracted by processor 17 from the electronic page image(s) 20 that describes the relationships between document components. The public information 24 is stored as a public file 32 on the external cloud storage 50. Public information 24 may also be stored on internal cloud storage 40 closer to the point of consumption to increase QoS (e.g., response time).

Figure 2:
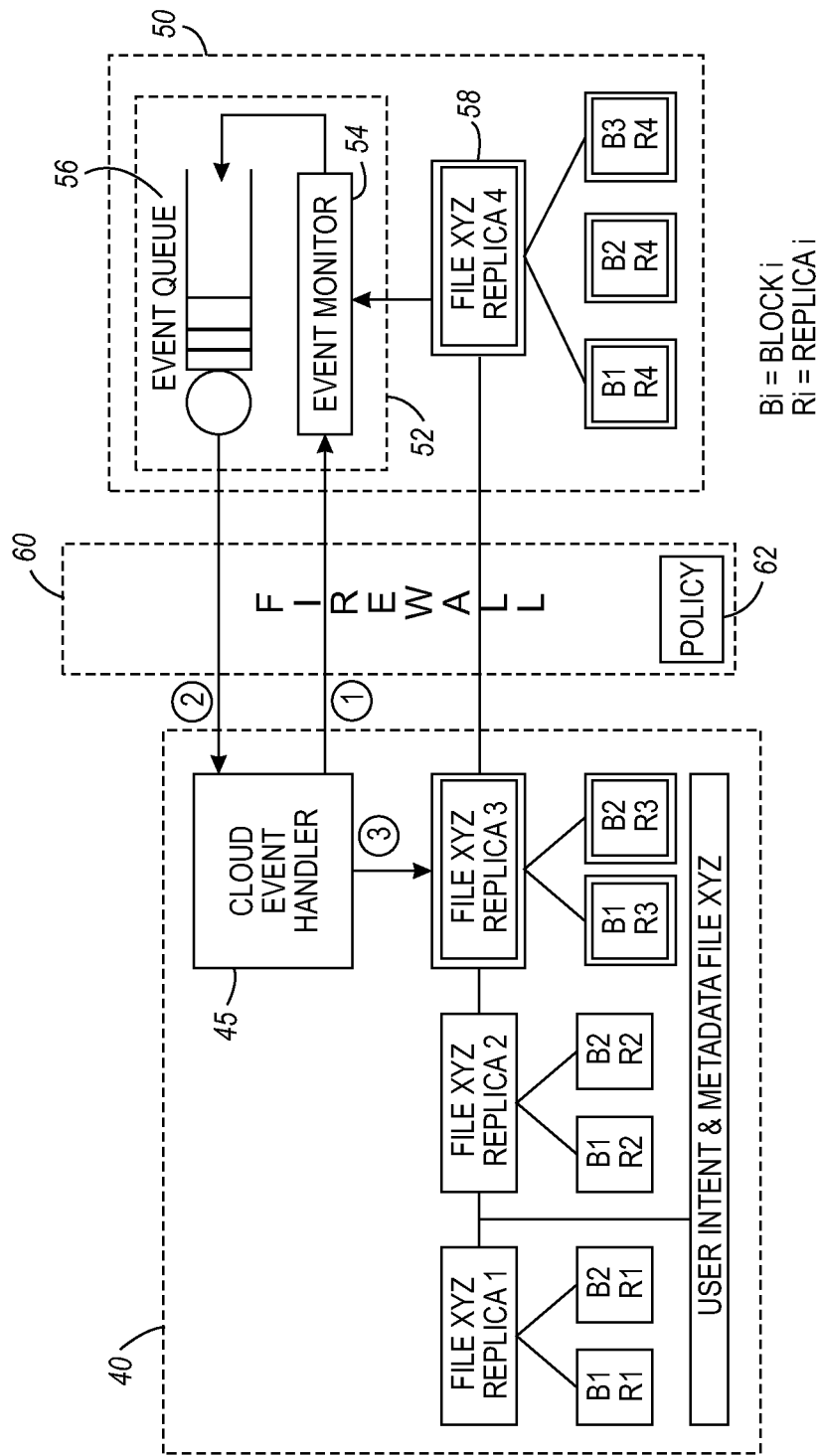
FIG. 2 is a schematic diagram illustrating communication between an external cloud storage and an internal cloud storage of the file storage system off FIG. 1.

With reference to FIG. 2, internal cloud storage 40 is adapted to provide internal data storage behind a firewall 60. With this purpose in mind, communications and/or network traffic originating from outside firewall 60 and attempting to pass through firewall 60 is inspected and either denied or permitted based on a set of rules or a user-defined policy 62. More specifically, the policy 62 defines rules dictating (lie storage parameters, security levels, and user authorization for accessing data or documents stored in internal cloud 40 from outside firewall 60. The policy 62 may be, for example, user preferences or a subscription to storage as a service that enables users to choose the manner in which their files are stored (e.g., publicly or privately) and, further, what level of security or encryption, protects their stored files. This is especially relevant in the medical industry wherein privacy of particular passages or information contained, in EMRs is paramount.

Private and public files 30 and 32 may be stored in a replicated fashion in the distributed file system. That is, a file may be replicated and/or split into a plurality of pieces. Each piece or replica differs slightly from the others in that each piece or replica includes a bit pattern different from the other (i.e., each replica is not identical byte-for-byte to any other replica). As indicated in FIG. 2, each replica Ri may include any number of constituent blocks Bi containing either private information 22 or public information 24. Each replica Ri is stored according to user intent and/or the policy 62 and with corresponding metadata that describes the relationships between components of each stored replica Ri of the file. The availability of storage in a distributed file system may be implemented by using, for example, Apache Hadoop, which will be selectively modified to include the concepts described in FIGS. 1 and 2. Hadoop is open source code and can be architected to compute and store documents in accordance with the above described file storage system 10. Once the replicas Ri are stored, locale aware storage may be achieved by utilizing the replication process of Hadoop to store one or more replicas Ri relatively close to the point of consumption and one or more replicas Ri one or more hops away from the point of consumption. As will be described in further detail below, the level of security protecting a replica Ri is incremented with each hop away from the point of consumption.

As illustrated in FIG. 2, for example, File XYZ has been, replicated four times with Replica 1 of File XYZ being closest to: the point of consumption and including two constituent blocks B1R1 and B2R1 of information. Replica 2 of File XYZ is one hop away from the point of consumption and includes two blocks B1R2 and B2R2 of information. Replica 3 of File XYZ is two hops away from the point of consumption and includes two blocks B1R3 and B2R3 of information. As the distance from the point of consumption increases, the constituent block sizes of a particular replicated file are incrementally smaller in size (i.e., less data or information) and the replicated file is encrypted with an encryption key relatively longer in length than an encryption key of a replicated file closer in hops to the point of consumption (as indicated, in FIG. 2 by additional outlining encompassing Replica 3 of File XYZ and constituent blocks B1R3, B2R3). As a result, the farther a particular replicated file is from the point of consumption, the larger the number of replicated files to decode or crack and the longer the encryption key. The illustrated embodiment of FIG. 2 illustrates an example scenario wherein Replicas R1, R2, and R3 are stored on internal cloud storage 40 and their corresponding constituent blocks of B1R1, B2R1, B1R2, B2R2, B1R3, and B2R3, respectively, may include private information 22 or public information 24. A fourth replica of File XYZ, namely Replica 4, is stored on external cloud storage 50 and includes three constituent blocks B1R4, B2R4, and B3R4 of public information 24. Since external cloud storage 50 is accessible by vendors without having to communicate through firewall 60, Replica 4 includes additional constituent blocks (e.g., 3 total) relative to Replicas 1-3 (e.g., 2 total for each replica), in this way, as discussed hereinabove. Replica 4 of File XYZ is provided with added security or encryption relative to Replicas 1-3 of File XYZ, which are stored on internal cloud storage 40 behind firewall 60. Prior to a replicated file (e.g., Replica 4 of File XYZ) being stored on external cloud storage 50, internal cloud storage 40 negotiates on storage parameters such as, for example, QoS (e.g., response time), allowed security, and block sizes. It is assumed that the numbers of replicas Ri for a given file is known to the system administrator or are defaulted to system-wide constant (e.g., 3 replicas per file; other contemporary distributed file systems such as Google file system and Hadoop use 3 as default).

As shown in the illustrated embodiment of FIG. 2, internal cloud storage 40 may incorporate an event handler 45 configured to store documents on an event-driven basis. In certain scenarios, all portions or replicas of the electronic page image 20 may be available on internal cloud storage 40 (i.e., inside the firewall 60). In this scenario, when accessing the page image 20 internally and/or from within internal cloud storage 40, the file storage system 10 may provide the complete page image 20 (e.g., on demand). However, in certain scenarios, a portion or portions of the page image 20 (e.g., public portion 24) may be stored outside firewall 60. In this scenario, when accessing the portion or portions from within internal cloud storage 40, a request is made by internal cloud storage 40 to external cloud storage 50. External cloud storage 50 includes an event processor 52 configured to capture requests from internal cloud storage 40 for portions of page image 20. More specifically, event, processor 52 incorporates an event monitor 54 that captures the request from internal cloud storage 40 and queues the request as an event in an event queue 56. Event handler 45 addresses events in the event queue 56 in a queued sequence and receives the requested files, file portions, and/or blocks of files from external cloud storage 50.

The need for event handler 45 and event processor 52 is clear when communications are originated from internal cloud 40. In most file system architectures, third parties (e.g., vendors) are not able to access cloud storage behind a firewall (e.g., internal cloud 40). However, when communications originate from internal cloud 40, a queued set of events may be processed in that very transaction. With this purpose in mind, the internal cloud 40 periodically polls event queue 56 for events placed thereon. Events may be, for example without limitation, direct requests from users, clients, or other cloud storage, for files or their constituent blocks. Event handler 45 batch processes such events from external cloud 50—this process may involve sending the user's files directly using the policy 62 of that user. Upon receiving confirmation from the user, the internal meta-data and files are updated. Confirmation from the user may be provided, for example, via a user interface (not shown) incorporated within document input device 15 or as part, of a separate computing device (not shown) operably coupled to document input device 15.

To access a file from external cloud 50, authorized users may directly access external cloud 50 for their documents. As discussed above, external cloud 50 only dispatches the public portion 24 of image 20. The private file 30 is either dispatched by internal cloud 40 (e.g., directly to the user, to the user's client software). Alternatively, the user may already have access to private information sufficient to render transmission of private files unnecessary. For example, such information corresponding to a particular user may be in a standard formal and/or included within a profile corresponding to that user. Through use of a client program, the user provides the necessary credentials (e.g., username, password, keyword, etc.) to decrypt and compose the entire document from the private portion(s) 22 and public portion(s) 24 of page image 20.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A file storage system comprising:
a document input device including a memory which stores instructions;

a hardware processor in communication with the memory for executing the instructions, the hardware processor being configured to decode an electronic page image and associate each piece of information in the electronic page image as belonging to one of sensitive and public portions;

a first cloud storage configured to store the public portion;

a second cloud storage configured to:
store the separated sensitive portion in response to user consent in a private file,
store metadata in the private file associated with the separated sensitive portion and describing a relationship between the sensitive and public portion,
store non-identical replicas of the sensitive portion in the private file, and
store metadata in the private file associated with the non-identical replicas and describing a relationship between components of each non-identical replica; and, an event handler operating on the first cloud storage and configured to poll the second cloud storage for at least one event queued thereon, wherein the event handler processes the at least one event in a queued sequence to facilitate communication of at least one portion of the electronic page image from the second cloud storage to the first cloud storage.

2. The file storage system according to claim 1, wherein said first cloud storage is internal relative to a firewall and the second cloud storage is external relative to the firewall.

3. The file storage system according to claim 1, wherein the separated portions are accessible through at least one of the first and second cloud storage based on a user credential, wherein the separated portions are used to compose the electronic page image.

4. The file storage system according to claim 1, wherein storage of the electronic page image is based on a user-defined policy.

5. The file storage system according to claim 1, wherein a level of security protecting the separated portions is customizable in accordance with a user-defined policy.

6. The file storage system according to claim 1, wherein each replica includes a bit pattern different from other replicas of the same electronic page image.

7. The file storage system according to claim 6, wherein each additional portion is stored at least one hop further from a point of consumption of the at least one document input device.

8. The file storage system according to claim 7, wherein a level of security protecting a portion increases as the number of hops from the point of consumption of the portion increases.

9. The file storage system according to claim 7, wherein an encryption key encrypting a portion is strengthened for each one hop further from the point of consumption of the portion.

10. The file storage system according to claim 7, wherein the portions include at least one constituent block of information, the at least one constituent block of information of a portion being incrementally smaller for each one hop further from the point of consumption of the portion.

11. The file storage system according to claim 1, wherein the at least one event is one of a direct request from a user for accessing the electronic gage image and a request from at least one other cloud storage for accessing the gage image.

12. The file storage system according to claim 1, wherein the at least one document input device is an multifunction device (MFD) incorporated within a networked environment.

13. A method for storing documents in a distributed file system (DFS) having at least one document input device, the method comprising:
storing instructions in a memory included in the at least one document input device;
executing the instructions by a hardware processor in communication with the memory, the executing including:
decoding, by the hardware processor, an electronic document and associating each piece of information in the electronic document as belonging to one of sensitive and public portions;
storing the public portion at a first cloud storage in communication with the hardware processor;
storing at a second cloud storage in communication with the hardware processor the separated sensitive portion in response to user consent in a private file;
storing at the second cloud storage metadata in the private file associated with the separated sensitive portion and describing a relationship between the sensitive and public portion;
storing at the second cloud storage non-identical replicas of the sensitive portion in the private file;
storing at the second cloud storage metadata in the private file associated with the non-identical replicas and describing a relationship between components of each non-identical replica; and,
operating an event handler on the first cloud storage, the operating including:
polling the second cloud storage for at least one event queued thereon, and
processing the at least one event in a queued sequence to facilitate communication of at least one portion of the electronic document from the second cloud storage to the first cloud storage.

14. A method according to claim 13, further comprising: storing the electronic document based on a user-defined policy.

15. A method according to claim 13, further comprising: customizing a level of security protecting the separated portions based on a user-defined policy.

16. A method according to claim 13, wherein each of the replicas include a bit pattern different from other replicas of the same electronic document.

17. A method according to claim 16, further comprising:
storing each additional portion at least one hop further from a point of consumption of the at least one document input device, wherein a level of security protecting the additional portion increases as the number of hops from the point of consumption the additional portion is stored increases.

18. A non-transient computer-readable medium storing programmable instructions configured to be executed by at least one processor for performing a method of storing documents on a distributed file system (DFS) having at least one document input device, the method comprising:
decoding an electronic document and associating each piece of information in the electronic document as belonging to one of sensitive and public portions;
storing the public portion at a first cloud storage in communication with the processor;
storing at a second cloud storage in communication with the processor the separated sensitive portion in response to user consent in a private file;
storing at the second cloud storage metadata in the private file associated with the separated sensitive portion and describing a relationship between the sensitive and public portion;

replicating at least one of the separated portions to generate a plurality of non-identical replicas;

storing the non-identical replicas of the sensitive portion in the private file;

storing at the second cloud storage metadata in the private file associated with the non-identical replicas and describing a relationship between components of each non-identical replica; and, operating an event handler on the first cloud storage, the operating including:

polling the second cloud storage for at least one event queued thereon, and processing the at least one event in a queued sequence to facilitate communication of at least one portion of the electronic document from the second cloud storage to the first cloud storage electronically accessing the separated portions from at least one of the internal cloud storage and the external cloud storage based on a user credential to generate the electronic document.

19. The non-transient computer-readable medium according to claim 18, wherein each of the replicas include a bit pattern different from each other.

\* \* \* \* \*